M. LEITCH.
YIELDABLE BEARING FOR CENTRIFUGAL MACHINES.
APPLICATION FILED APR. 13, 1920.

1,387,158.

Patented Aug. 9, 1921.

WITNESS:
Rob R Kitchel.

INVENTOR
Meredith Leitch
BY
Frank S. Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

YIELDABLE BEARING FOR CENTRIFUGAL MACHINES.

1,387,158.                Specification of Letters Patent.        Patented Aug. 9, 1921.

Application filed April 13, 1920. Serial No. 373,651.

*To all whom it may concern:*

Be it known that I, MEREDITH LEITCH, a citizen of the United States, residing at Poughkeepsie, county of Dutchess, and State of New York, have invented a new and useful Improvement in Yieldable Bearings for Centrifugal Machines, of which the following is a full, clear, and exact description, reference being had to the accompanying drawings, which form a part of this specification.

My invention is an improvement in cushioning means for yieldable bearings for centrifugal machines.

I have observed that where a metallic spring is used to cushion a bearing, the return force of the cushion is as great as the resistance to displacement. This results in a tendency to a persistence of any vibration once set up. I have also observed that with a rubber cushion there is a certain considerable amount of lag in the return force which might be likened to hysteresis in transformer cores and has a decided damping effect on vibrations.

I know that rubber cushions have been used around the upper bearings for centrifugal machines, but they have been unsatisfactory for three reasons.

Heat from the bearings causes deterioration of the rubber, escaping oil soaks into the rubber and rots it, and there is no means for adjusting the tension.

The object of my invention is to provide a rubber cushioned bearing with which a minimum amount of heat will be transmitted from the bearing to the rubber, with which no oil from the bearing can gain access to the rubber, and with which it is possible to adjust the tension.

In the accompanying drawings, which show a preferred embodiment of my invention:

Figure 1:
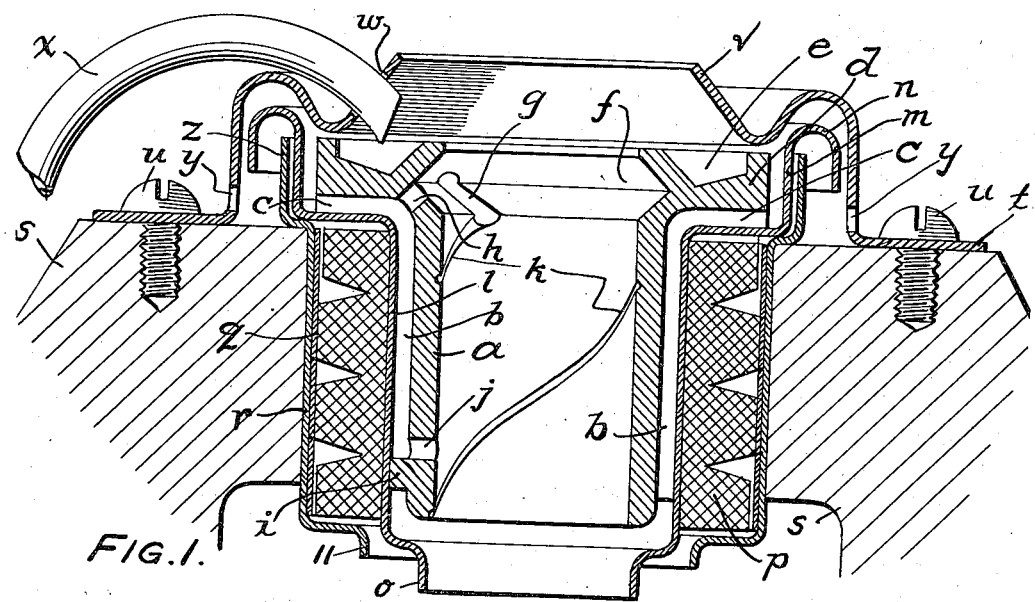
Figure 1 is a vertical section through the bearing on the line 1—1 of Figs. 2 and 3, and through the casings and retainer.
Figure 2:
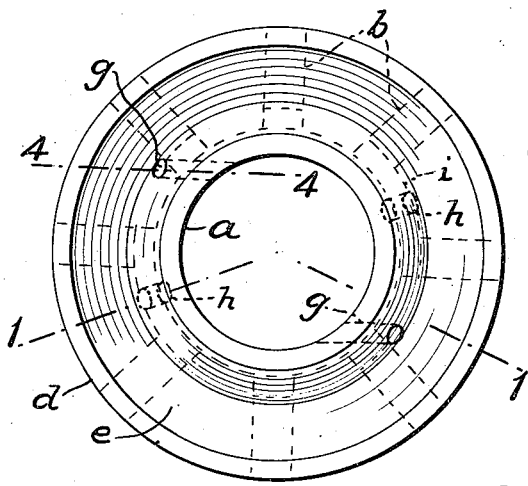
Fig. 2 is a top view, and Fig. 3 a bottom view, of the bearing liner.
Figure 3:
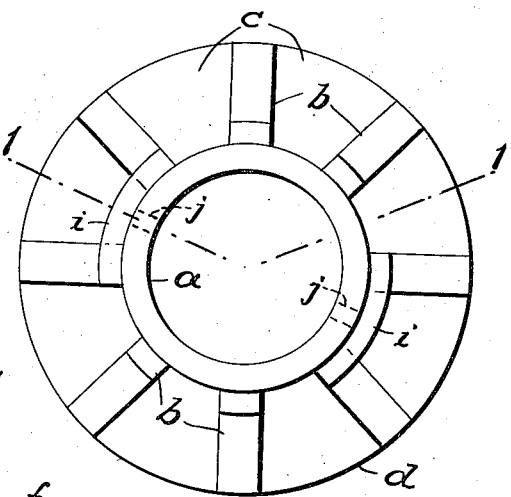
Figure 4:
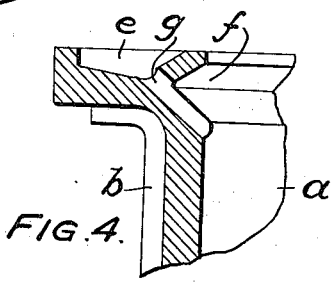
Fig. 4 is a part section of the liner on the line 4—4 of Fig. 2.

The bearing liner $a$ has, on its outside, several ribs $b$, which are turned outward at $c$. Around the upper part of the liner is a flange $d$ in which is formed an oil receiving trough $e$. Inside the flange there is an annular groove $f$. Two holes $g$ lead from the bottom of the trough downward at such an angle that the bottom of the hole is below the bottom of the groove $f$. Two other holes $h$ lead from near the center of the annular groove $f$ to the two spaces between two pairs of ribs $b$. Across the bottom of each of these two spaces there is a horizontal wall $i$. Immediately above each wall $i$ a hole $j$ leads to the interior of the bearing. Two helical grooves $k$ are cut in the bearing face leading upward in the direction of rotation.

Around the bearing liner, closely fitting the ribs $b$, is a shell $l$, the upper part of which is turned outward below the flange $d$, then turned upward at $m$, with a good clearance from the outside of the flange $d$, and rolled outward and downward at $n$ to form a drip edge. The lower end of the shell extends below the liner $a$ and is so reduced in size at $o$ that it is but little larger than the bore of the bearing.

Around the body of the shell $l$ is a rubber cushion $p$ surrounded by a metallic strip $q$ forced into a frame liner $r$. The body of the liner $r$ is a force fit in the frame $s$, but above the frame it is enlarged and forms an upstanding ring $z$ intermediate in diameter between the portions $m$ and $n$ of the bearing shell. Below the cushion the liner $r$ is reduced nearly to the diameter of the body of the shell $l$ and is turned downward at 11.

A bearing retaining plate $t$, secured by screws $u$ to the frame $s$, is turned upward outside of the portion $n$ of the shell, inward and downward until it barely clears the top of the flange $d$, and then upward at $v$ toward the center but having a center hole larger than the bore of the bearing.

Through the portion turned upward toward the center there is a hole $w$ for the end of an oil supply tube $x$. Just above the frame $s$, the plate $t$ has several oil escape holes $y$.

When in operation, oil from the tube $x$ falls into the trough $e$ and flows down through the holes $g$, filling the lower part of the groove $f$. When this groove is about half filled, the oil flows through the holes $h$ into two of the spaces between ribs $b$, downward within these spaces until stopped by the wall $i$, and then through the holes $j$ to the inside of the bearing. Rotation of the spindle carries the oil around to the grooves $k$ and gradually forces it up the grooves until it escapes into the annular groove $f$ and starts to re-circulate. While the oil is passing up the groove $k$, enough escapes to maintain a lubricating film between the bearing and the spindle. As more oil is fed, the space above the walls $i$ between the ribs $b$ fills full of oil, thus supplying all the oil that can pass through the holes $j$. When this space is full, any excess oil passes around the ends of the ribs $c$ and downward through the spaces between ribs $b$ not closed by the walls $i$, and falls inside the frame of the machine. The bottom $o$ of the shell extends so far down that this oil cannot reach the rubber cushion $p$.

If oil follows up the spindle and flies off above the top of the bearing it will be caught by the inwardly turned portion $v$ of the bearing retaining plate and flow downward to either the trough $e$ or the space outside the flange $d$.

If the spaces between the ribs $b$ become clogged so that the oil cannot escape through them, it can flow upward over the portion $m$ and downward over the portion $n$ of the shell into the space outside the ring $z$ and escape through the holes $y$. The ring $z$ stands so high above the escape holes $y$ that there is no danger of oil passing over the ring and thus reaching the upper end of the rubber.

The bottom 11 of the frame liner $r$ extends so far downward that oil splashed from the driving mechanism cannot pass inside of it up to the rubber cushion.

The spaces between the ribs $b$ are large enough to allow, between the body of the bearing and the shell $b$, a considerable circulation of air to prevent heating of the shell and the surrounding rubber.

The metallic strip $q$ prevents the rubber ring coming in contact with and sticking to the frame liner $r$. The bearing and rubber ring, therefore, may be easily removed from the machine.

If, after long use, a rubber ring becomes too soft to give proper support to the bearing, a strip of heavy paper or thin cardboard may be wound around it, inside the metallic strip, compressing the rubber so as to give better support to the bearing.

From the above description, it will be understood that I have produced a rubber-cushioned bearing that has a minimum heating effect on the rubber, avoids danger of oil rotting the rubber, and has provision for adjustment of the cushioning effect of the rubber.

Having now fully described my invention, what I claim and desire to protect by Letters Patent is:

1. In a yieldable bearing for centrifugal machines, the combination with a bearing liner internally grooved near its upper end to receive oil, of means affording an oil passage outside the liner, the liner having a hole to allow oil to flow from said groove to said passage and another and lower hole to allow oil to flow from said passage to the interior of the liner.

2. In a yieldable bearing for centrifugal machines, the combination with a bearing liner internally grooved near its upper end to receive oil and provided at its top with an oil receiving trough, of means allowing a flow of oil from the trough to the groove, from the groove to the outside of the liner, and from the outside to the inside of the liner near its lower end.

3. In a yieldable bearing for centrifugal machines, the combination with a bearing liner and a surrounding shell, of downwardly extending ribs between the liner and shell affording an oil passage between them, and a cross wall closing said passage at the bottom, there being holes in the upper and lower parts of the liner communicating with said passage.

4. In a yieldable bearing for centrifugal machines, the combination with a bearing liner and a surrounding shell, of a series of downwardly extending ribs between the liner and shell, affording passages, a cross wall closing one or more of said passages at the bottom, the remaining passages being open at the bottom to allow flow of air, there being holes in the upper and lower parts of the liner communicating with the passage or passages closed at the bottom.

5. In a yieldable bearing for centrifugal machines, a bearing liner having an interior upwardly closed annular groove near its upper end, an oil receiving trough encircling the upper end of the liner, oil feed holes connecting said trough and said annular groove, an oil feed near the bottom of the liner, a helical return groove on the interior of the liner, and means for feeding oil from said annular groove to said oil feed.

6. A bearing liner having an interior helical groove and in its upper portion an interior annular groove, an oil receiving trough around the grooved upper portion of the liner, there being a hole in the trough and a groove in the annular groove registering with the hole, and provisions for flow of oil from the annular groove to the lower part of the helical groove.

7. In a yieldable bearing for centrifugal machines, the combination of a bearing liner, a surrounding cushion, a shell within the cushion, and ribs between the liner and the shell.

8. In a yieldable bearing for centrifugal machines, the combination of a bearing liner, a surrounding cushion, a shell between the liner and cushion, said shell extending below the cushion and there bent inward and downward below the liner, the upper portion of the shell extending outward over the cushion, and thence upward, outward and downward to form an annular shed.

9. In a yieldable bearing for centrifugal machines, the combination with a bearing, a bearing liner, and a cushion between the liner and support, of two separate shells, one interposed between the liner and cushion and extending above the cushion and having an oil shed extending above and outside said cushion, and the other interposed between the cushion and support and having its upper end extending within said oil shed.

10. In a yieldable bearing for centrifugal machines, the combination of a bearing liner, a surrounding cushion, a shell between the liner and cushion and extending over, above and outside the cushion to form a shed, an outside frame, a liner between the frame and cushion extending above the frame and within said shed, and a bearing retaining plate secured to the frame and extending upwardly around, and inwardly above, said shed and provided with an oil hole below the lower edge of the shed.

11. In a yieldable bearing for centrifugal machines, the combination with a bearing liner, a shell outside the liner having an oil shed extending outward and downward from its upper end, a rubber cushion outside the shell, and a cushion-surounding member having its upper edge within and higher than the lower edge of the shed, of a bearing retaining plate having oil escape holes substantially lower than the upper edge of the cushion-surrounding member.

12. In a yieldable bearing for centrifugal machines, the combination with a bearing liner, a shell, a rubber cushion and a cushion-surrounding member, of an adhesion-preventing member between the cushion and the cushion-surrounding member.

13. In a yieldable bearing for centrifugal machines, the combination of a bearing liner, means to feed oil to the upper end thereof, a shell around the liner, means affording passages for cooling air between the liner and shell and other passages, for flow of oil from the upper end outward, downward and inward to near the lower end of said liner, means to cause flow of oil within the bearing from the bottom to the top thereof, an oil shed from the top of the shell, a rubber cushion around the liner, and a cushion-surrounding member having its upper edge within and higher than the oil shed.

14. In a yieldable bearing for centrifugal machines, the combination of a rubber cushion, a bearing liner exteriorly ribbed to provide passages for cooling air, a bearing shell having a lower end extending below the bottom of the liner and an enlarged upper end extending above the top of the liner and provided with a still larger downwardly turned drip edge, a cushion-surrounding member having a reduced-diameter lower end extending downward below the bottom of the cushion and an enlarged upper end extending upward inside the drip edge, and a bearing retaining plate with oil escape holes substantially lower than the upper edge of the cushion-surounding member.

15. A bearing for centrifugal machines comprising inner and outer shells for the reception of a spindle bearing liner and arranged to be inserted in the bearing support in the machine frame, a compressible member between said shells, and oil sheds at both ends of the shells to prevent oil entering between the shells.

16. In a yieldable bearing for a centrifugal machine, the combination with the frame of the machine, the spindle bearing liner and a compressible member between the frame and the liner, of inner and outer shells, one surrounding the compressible member and between the compressible member and the frame of the machine, and the other between the compressible member and the spindle bearing liner, air passages for reducing the conductivity of heat from the liner to the inner shell, and oil sheds on the shells to prevent oil entering the space between the shells.

In testimony of which invention, I have hereunto set my hand, at Poughkeepsie, N. Y., on this 9th day of April, 1920.

MEREDITH LEITCH.